Nov. 12, 1935.   C. G. BRIEL   2,020,821
METHOD OF PRODUCING COMPOSITE PICTURES
Filed Oct. 12, 1931
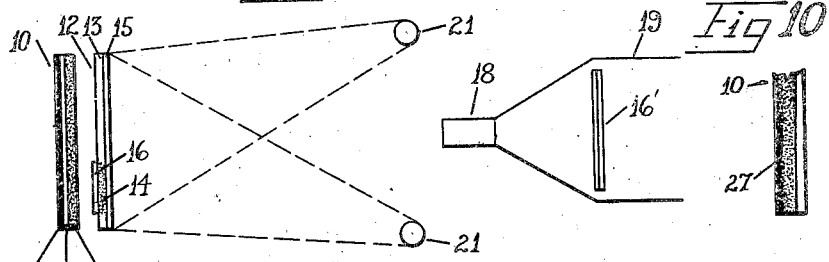
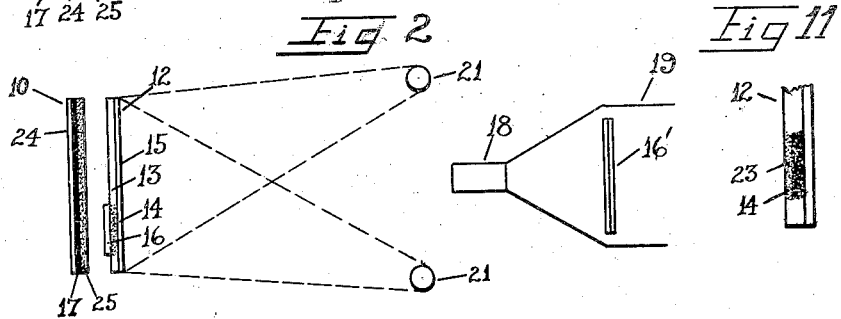
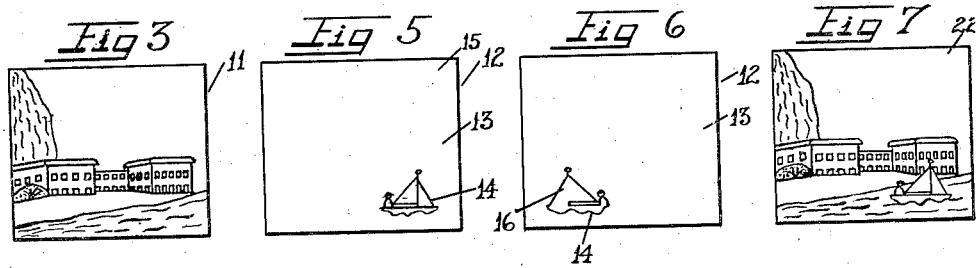
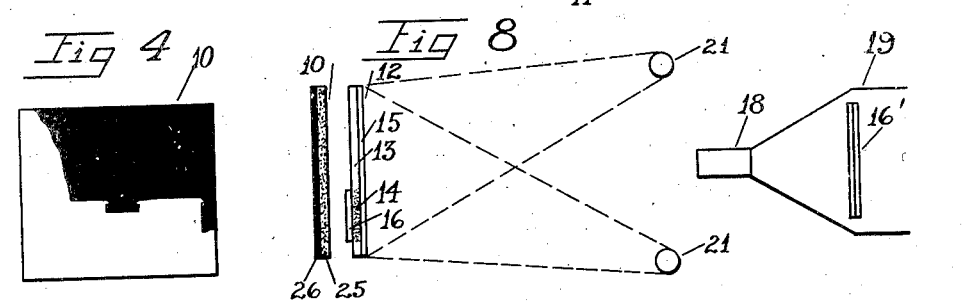
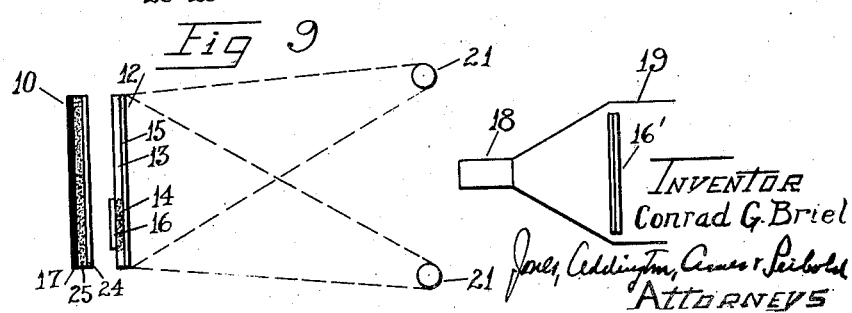
INVENTOR
Conrad G. Briel
ATTORNEYS Patented Nov. 12, 1935

2,020,821

UNITED STATES PATENT OFFICE 2,020,821

METHOD OF PRODUCING COMPOSITE PICTURES

Conrad G. Briel, Chicago, Ill., assignor to Cinema Development Company, Chicago, Ill., a corporation of Illinois Application October 12, 1931, Serial No. 568,387

3 Claims. (Cl. 88—16)

This invention relates to a method of producing composite pictures.

More particularly, this invention relates to a method of producing composite pictures embodying two or more component pictures, which includes placing the components in superposed relation and illuminating them with lights with which they are respectively illuminable, and, by a single exposure, producing a composite picture.

The desirability of producing composite photographs is particularly marked in the motion picture art, but the invention herein described is not limited to this art alone but may be used generally in photography.

Broadly, two or more original scenes or components may be composed into a single picture by the use of film transparencies, one comprising a selected background and the other comprising a selected action, which are superposed and photographed, and both components having their images rendered opaque to but reflective of light, the specific disclosure including applying a coating having both characteristics of light reflectivity and opacity to the image of the foreground film, and then treating the image of the background film to be reflective of light, as by bleaching, and applying an opaque and non-actinic coating to the background film, preferably over the entire film, so that when both components are superposed and illuminated by reflected light, a composite photograph may be produced.

The present invention is an improvement upon the methods of producing composite pictures disclosed and claimed in my co-pending applications, Serial Number 568,384, filed October 12, 1931, and Serial Number 568,385, filed October 12, 1931, both being assigned to the present assignee.

In order to apprise those skilled in the art how to practice my invention, I shall now describe several preferred embodiments in connection with the accompanying drawing which forms a part hereof.

In the drawing:

Figure 1 illustrates one of the various ways of placing a treated foreground film adjacent to a treated background film, and photographing to produce a composite picture by a single exposure;

Fig. 2 is a similar illustration showing an alternative embodiment of the present invention;

Fig. 3 is a front elevation of a positive background scene, the film being that usually employed in photography;

Fig. 4 is a negative of a background scene shown in Fig. 1;

Fig. 5 is a positive image on a film to be used as a foreground;

Fig. 6 is the same image shown in Fig. 5, but looking at the opposite or emulsion side to show the opaque but light-reflective coating over the image;

Fig. 7 illustrates a finished composite picture carrying the images of the foreground and the background thereon as a complete picture;

Figs. 8 and 9 illustrate additional alternative embodiments of the invention;

Fig. 10 illustrates an alternative method of treating the background component; and Fig. 11 illustrates an alternative method of treating the foreground component.

The components used may be the usual black and white diapositives, such as the ordinary cinema projecting film, or plates used in still photography, or they may be paintings, depending upon the characters or images to be combined and the superposing to be done.

When the extensively used present-day film is developed, the images are formed by the fixation of innumerable minute particles of metallic silver imbedded in the gelatin of the photographic emulsion, there being relatively more silver particles in the shadows than in the high-lights but somewhat uniformly distributed throughout the depth of the photographic emulsion.

The present invention is very well adapted to this type of photographic film, but it will be understood that the invention might well be applied to other film where the images are produced in a different manner or have different physical characteristics.

As shown in the drawing, the background may be scenery or other objects in the form of a painting or photographic film and may be produced by making a negative 10, as shown in Fig. 4. Positive print 11 of negative 10 is shown in Fig. 3.

As a specific example, the foreground film 12 shown in Fig. 5 may be the usual diapositive, such as the ordinary cinema projecting film, having the area 13 about the image 14 transparent and the image 14 comprising metallic silver imbedded in the photographic emulsion carried by the base 15 of the film. The action or objects, of which the foreground image 14 is composed, may be photographed in front of a white ground, so that, when a positive print is made from the negative, the area 13 about the image will be transparent or relatively free from silver deposit. Foreground component or positive print 12 is then treated to make its image 14 opaque to but reflective of light. To this end, a coating 16, which is opaque to but reflective of light, is applied to image 14, preferably at the emulsion side of the film. Fig. 6 illustrates image 14 after it has been coated by opaque but light-reflective substance 16, and is a view looking at the emulsion side of the foreground film 12. Opaque and light-reflective coating 16 may be applied to the image 14 either manually, mechanically, chemically, optically, photographically or electrolytically, and while it is shown applied to image 14 upon the emulsion side, it will be understood that it may be applied to the base side 15 when the occasion may require.

In order to make the image of the background component reflective of light, film 10 is treated, say by bleaching, in any well known way, so that the particles of silver deposit will be changed into a light figure or into a substance which reflects light. Bleaching the background image will preferably necessitate the use of a negative for the background, because such bleaching causes in effect a change of the negative into a positive when said bleached image is coated black and viewed by reflected light. It will be remembered that the photographic impression on background negative 10, shown in Fig. 4, may be either inherently reflective of light, or otherwise previously treated to be reflective of light, for any purpose whatsoever.

I do not wish to be limited to the particular way this step of the invention is accomplished, but merely suggest bleaching the silver deposit on the background component to a whiteness as one method of obtaining the desired results, the density of the whiteness varying according to the density of the metallic silver, with a corresponding variation of reflectivity for light to effect a correct reproduction of the image and its details when photographed upon negative film 16'.

Bleaching the silver image on a film is a step well known in the art. As an example, I suggest the use of a re-agent comprising mercuric chloride and potassium bromide, which changes the metallic silver into a complex silver mercury bromide. The density of the image may be somewhat built up in the bleaching action, but this is not necessary for the purpose of the present invention because it may be said that it is quite desirable to control the intensification of the image and even restrict it as much as possible, so that the density and contrast of the image will remain quite uniform throughout the steps of the process. A relatively opaque or non-actinic coating 17 may then be applied to the rear surface of background negative 10 in any suitable way. By the term "rear surface" I mean the surface that is away from and not facing lens 18 of camera 19.

As an alternative method of applying an opaque or non-actinic substance to the background image, I have found that after this background image is bleached, the film 10 may then be dipped or passed through any well-known developing solution so that the particles near the surface comprising the complex silver mercury bromide of the bleached image impression will be darkened to form a backing, as indicated at 27 in Fig. 10, which backing will be relatively opaque, and might also possess the characteristic of being non-actinic, and permit the remaining particles of silver mercury bromide of the bleached image impression to reflect light varyingly.

The next step in the method herein disclosed consists in placing negative background film 10 and positive foreground film 12, after both components have been treated, in superposed relation. As shown in the drawing, background negative 10 and foreground positive 12 need not be in actual contact but may be arranged in suitable position in one focal plane of lens 18 of camera 19, while unexposed film 16' may be arranged in the other focal plane of lens 18. By proper lighting effects, these films may be illuminated so that they may be photographed by camera 19, or otherwise exposed to film 16', and a composite picture produced upon film 16', which, in this case, will be a negative.

The particular step of illuminating films 10 and 12 may be varied from that shown in the drawing, but, as illustrated, it is preferred to use a light or lights 21 placed in any suitable position to secure the desired results. It is possible to space the components a suitable distance apart and employ separate illuminators for illuminating the background 10 and the foreground component 12. If an arrangement is used which is shown in the drawing, the rays of light from illuminators 21 will pass through the clear area 13 of the foreground component 12 and be reflected back from the background film 10 through this clear area 13 of film 12, except where foreground image area 14 appears thereon, thereby effecting illumination of the background component by reflection. Coating or surface 16 serves to prevent the passage of reflected light from background film 10 through the foreground image area, while at the same time it causes the reflection of the rays of light from the illuminators so that the details of the foreground image 14 will appear clear and distinct in the composite picture. Film 22 is a positive of negative 16' and illustrates a complete composite picture of the images shown in the background and foreground films illustrated in the drawing.

The character of coating 17 required to accomplish the herein desired results need only be such as will be relatively opaque or opaque and non-actinic or absorptive of light rays. It may be of any color, although I desire that coating 17 be somewhat dark or have less actinic value than the image impression on background component 10. The character of foreground coating 16 required to accomplish the herein desired results need only be such as will be opaque to but reflective of light, preferably being, however, of light color.

I have found that the coating 16 may be obtained by dipping foreground film 12 into a bleaching re-agent, which re-agent may be similar to that above described, if so desired, until the particles near the surface of the foreground image 14 are bleached to a substantial whiteness, this step being controlled to the extent of restricting the bleaching action upon the surface particles to a depth sufficient to produce a backing 23, as shown in Fig. 11, similar to coating 16, having the necessary light reflectivity to show the details of the foreground image 14 upon the composite picture, the image having been made by over-exposing and deeply developing in order to furnish the necessary opacity. The method of producing an opaque and light-reflective surface in this manner has been disclosed and claimed in my co-pending application Serial No. 532,840, filed April 25, 1931.

In instances where coating 17 is employed, this coating may be applied to background component 10 in a number of different ways, as illustrated in Figs. 1, 2, 8 and 9.

Where the emulsion of background film 10 and the foreground film 12 face each other, as shown in Fig. 1, coating 17 may be applied over the entire area of celluloid base 24, so that the photographic emulsion is spaced from this opaque or non-actinic coating 17 by this celluloid base 24.

In Fig. 2, coating 17 is arranged in optical contact with the background image and as a substratum over the entire film between the celluloid base 24 and the emulsion 25.

It will be understood that although I have described the present invention in connection with the standard photographic film, wherein the sensitive photographic material is carried upon a base, such a celluloid, any type of film may be used and a celluloid base is not essential.

In Fig. 8, the background emulsion is shown carried upon a sheet of dark material 26. This material may be of any suitable substance, such as paper, and may serve the same purpose as coating 17.

In Fig. 9 there is shown an arrangement embodying the application of coating 17 to the emulsion 25 of background component 18, so that the celluloid 24 is arranged to face the foreground component 12.

In the drawing, the photographic emulsion is shown considerably thicker in cross section than the celluloid base contrary to the actual proportions generally used in the ordinary photographic film; but it will be understood that this showing is made for the purpose of illustration only, that these proportions may vary, and that the proportions of the standard photographic film are also contemplated.

Other advantages and objects will be apparent to those skilled in the art, and therefore I do not wish to be limited to the exact details or steps described and shown herein, since many modifications are possible without departing from the spirit and scope of the invention.

I claim:

1. The method of producing a composite photograph embodying two component parts, one appearing as a foreground and the other as a background upon the composite, which includes making a photographic image of the foreground component and providing an opaque but light reflective backing therefor, making a light reflective photographic image of the background component, providing a non-actinic backing for said background image, superposing the foreground image upon the background image and illuminating them by reflected light, and exposing a fresh actinic surface to the images so superposed and illuminated.

2. The method of producing a composite photograph embodying two component parts, one appearing as a foreground and the other as a background upon the composite, which includes making photographic images of both components, providing an opaque but light reflective backing for the foreground image, treating the background image to make it reflective of light, further treating the light reflective background image to make it varyingly reflective of light, superposing the foreground image upon the background image and illuminating them by light with which they are respectively illuminable, and exposing a fresh actinic surface to the images so superposed and illuminated.

3. The method of producing a composite photograph embodying two component parts, one appearing as a foreground and the other as a background upon the composite picture, which includes making photographic silver deposit images of both components, providing an opaque but light reflective backing for the foreground image, chemically transforming the background image to make it reflective of light, applying a non-actinic backing to the light reflective background image to make it varying reflective of light, superposing both images and illuminating them, and exposing a fresh actinic surface to the images so superposed and illuminated.

CONRAD G. BRIEL.